(12) United States Patent
Baldwin et al.

(10) Patent No.: US 9,170,334 B2
(45) Date of Patent: Oct. 27, 2015

(54) LOCALISING TRANSPORTABLE APPARATUS

(71) Applicant: The Chancellor Masters and Scholars of The University of Oxford, Oxford, Oxfordshire (GB)

(72) Inventors: Ian Alan Baldwin, Oxfordshire (GB); Paul Michael Newman, Oxfordshire (GB)

(73) Assignee: THE CHANCELLOR MASTERS AND SCHOLARS OF THE UNIVERSITY OF OXFORD, Oxford (GB)

( * ) Notice: Subject to any disclaimer, the term of this patent is extended or adjusted under 35 U.S.C. 154(b) by 0 days.

(21) Appl. No.: 14/348,438

(22) PCT Filed: Sep. 26, 2012

(86) PCT No.: PCT/GB2012/052381
§ 371 (c)(1),
(2) Date: Mar. 28, 2014

(87) PCT Pub. No.: WO2013/045917
PCT Pub. Date: Apr. 4, 2013

(65) Prior Publication Data
US 2014/0233010 A1   Aug. 21, 2014

(30) Foreign Application Priority Data
Sep. 30, 2011   (GB) .................. 1116959.6

(51) Int. Cl.
*G01C 3/08*      (2006.01)
*G01S 17/89*     (2006.01)
(Continued)

(52) U.S. Cl.
CPC ................ *G01S 17/89* (2013.01); *G01C 21/30* (2013.01); *G01P 21/00* (2013.01); *G01S 7/4808* (2013.01); *G01S 7/497* (2013.01); *G01S 17/06* (2013.01); *G01S 17/88* (2013.01)

(58) Field of Classification Search
CPC ...... G01C 3/08; G01C 15/002; G01C 15/006; G01C 1/04; G01S 17/89; G01S 17/023; G01S 17/936; G01S 17/42; G01S 17/06
USPC .............. 356/3.01–3.16, 4.01–4.1, 5.01–5.15
See application file for complete search history.

(56) References Cited

U.S. PATENT DOCUMENTS

| 6,194,860 B1 | 2/2001 | Seelinger et al. |
| 7,693,654 B1 * | 4/2010 | Dietsch et al. ................ 701/461 |

(Continued)

FOREIGN PATENT DOCUMENTS

| GB | 2162014 A | 1/1986 |
| WO | 2013004935 A1 | 4/2013 |

(Continued)

OTHER PUBLICATIONS

Levinson et al. "Robust Vehicle Localization in Urban Environments Using Probabilistic Maps", Stanford University, 2010.*
(Continued)

*Primary Examiner* — Luke Ratcliffe
*Assistant Examiner* — Assres H Woldemaryam
(74) *Attorney, Agent, or Firm* — Finch & Maloney PLLC

(57) ABSTRACT

A method of localizing transportable apparatus (100) within an environment including receiving (402) data obtained from a ranging sensor device (102) of the transportable apparatus configured to collect information relating to at least a surface (120) over which the transportable apparatus is moving in an environment, and using (404) the ranging sensor device data to generate a new 3D point cloud (110) of the environment. The method further obtains (406) data representing an existing 3D point cloud (114) of at least part of the environment, and seeks to match (408) the new 3D point cloud with, or within, the existing 3D point cloud in order to localize the transportable apparatus with respect to the existing point cloud.

11 Claims, 7 Drawing Sheets

(51) Int. Cl.
| | |
|---|---|
| G01C 21/30 | (2006.01) |
| G01P 21/00 | (2006.01) |
| G01S 7/48 | (2006.01) |
| G01S 7/497 | (2006.01) |
| G01S 17/06 | (2006.01) |
| G01S 17/88 | (2006.01) |

(56) References Cited

U.S. PATENT DOCUMENTS

| | | | |
|---|---|---|---|
| 8,290,305 | B2 | 10/2012 | Minear et al. |
| 8,447,474 | B2 | 5/2013 | Breed |
| 8,626,392 | B2 | 1/2014 | Kojo |
| 2007/0071311 | A1* | 3/2007 | Rovira-Mas et al. ......... 382/154 |
| 2008/0033645 | A1 | 2/2008 | Levinson et al. |
| 2009/0005961 | A1 | 1/2009 | Grabowski et al. |
| 2009/0076655 | A1 | 3/2009 | Blondel et al. |
| 2010/0013615 | A1 | 1/2010 | Hebert et al. |
| 2010/0106356 | A1* | 4/2010 | Trepagnier et al. ............ 701/25 |
| 2010/0114416 | A1 | 5/2010 | Au et al. |
| 2010/0121577 | A1 | 5/2010 | Zhang et al. |
| 2010/0183192 | A1 | 7/2010 | Fritsch et al. |
| 2010/0245573 | A1 | 9/2010 | Gomi et al. |
| 2011/0123135 | A1 | 5/2011 | Hsieh et al. |
| 2011/0205338 | A1 | 8/2011 | Choi et al. |
| 2012/0050525 | A1 | 3/2012 | Rinner et al. |
| 2012/0123642 | A1 | 5/2012 | Kojo |
| 2012/0203431 | A1 | 8/2012 | Kojo et al. |
| 2013/0120578 | A1 | 5/2013 | Iga et al. |
| 2013/0162829 | A1 | 6/2013 | Kadowaki et al. |
| 2014/0240501 | A1 | 8/2014 | Newman et al. |
| 2014/0240690 | A1 | 8/2014 | Newman et al. |
| 2014/0249752 | A1 | 9/2014 | Napier et al. |

FOREIGN PATENT DOCUMENTS

| | | |
|---|---|---|
| WO | 2013045917 A1 | 4/2013 |
| WO | 2013045927 A1 | 4/2013 |
| WO | 2013045932 A1 | 4/2013 |

OTHER PUBLICATIONS

Glennie et al. "Static Calibration and Analysis of the Velodyne HDL-64E S2 for High Accuracy Mobile Scanning", remote sensing, 2010.*

Harrison et al. "TICSync: Knowing When Things Happened", IEEE, 2011.*

International Preliminary Report on Patentability received for Patent Application No. PCT/GB2012/052381, mailed on Apr. 10, 2014, 11 pages.

International Search Report and Written Opinion of the International Searching Authority received for Patent Application No. PCT/GB2012/052381, mailed on Dec. 12, 2012, 17 pages.

GB Intellectual Property Office Search Report under Section 17(5) received for GB Patent Application No. 1116959.6 mailed Jan. 24, 2012, 3 pages.

Levinson, et al., "Robust Vehicle Localization in Urban Environments Using Probabilistic Maps," IEEE International Conference on Robotics and Automation, Anchorage, Alaska, May 3-8, 2010, pp. 4372-4378.

Cole, et al., "Using Laser Range Data for 3D SLAM in Outdoor Environments," IEEE International Conference on Robotics and Automation, Orlando, Florida, May 15-19, 2006, pp. 1556-1563.

Moosmann, et al., "Velodyne SLAM," IEEE Intelligent Vehicles Symposium (IV), Baden-Baden, Germany, Jun. 5-9, 2011, pp. 393-398.

Baldwin, et al., "Road vehicle localization with 2D push-broom LIDAR and 3D priors," IEEE International Conference on Robotics and Automation, RiverCentre, Saint Paul, Minnesota, May 14-18, 2012, pp. 2611-2617.

Glennie, et al., "Static Calibration and Analysis of the Velodyne HDL-64E S2 for High Accuracy Mobile Scanning," Remote Sensing, vol. 2, No. 6, Jun. 22, 2010, 15 pages.

Harrison, et al., "TICSync: Knowing When Things Happened," IEEE International Conference on Robotics and Automation, Shanghai International Conference Center, May 9-13, 2011, pp. 356-363.

Weste, et al., "Dynamic Time Warp Pattern Matching Using an Integrated Multiprocessing Array," IEEE Transactions on Computers, vol. C-32, No. 8, Aug. 1, 1983, pp. 731-744.

International Preliminary Report on Patentability received for Patent Application PCT/GB1201/052393, mailed on Apr. 10, 2014, 8 pages.

International Search Report and Written Opinion of the International Searching Authority received for Patent Application No. PCT/GB2012/052393, mailed on Jan. 3, 2013, 12 pages.

GB Intellectual Property Office Search Report under Section 17(5) received for GB Patent Application No. 1116961.2 mailed Mar. 22, 2012, 3 pages.

Jordt, et al., "Automatic High-Precision Self-Calibration of Camera-Robot Systems," IEEE International Conference on Robotics and Automation, Kobe, Japan—May 12-17, 2009, pp. 1244-1249.

Saez, et al., "Underwater 3d SLAM through Entropy Minimization," IEEE International Conference on Robotics and Automation, Orlando, Florida—May 15-19, 2006, pp. 3562-2567.

Underwood, et al., "Error Modeling and Calibration of Exteroceptive Sensors for Accurate Mapping Applications," Journal of Field Robotics, vol. 27, No. 1., Jan. 1, 2010, pp. 2-20.

Sheehan, et al., "Automatic Self-Calibration of a Full Field-Of-View 3D n-Laser Scanner," International Symposium on Experimental Robotics, Delhi, India, Dec. 18, 2010, 14 pages.

International Preliminary Report on Patentability received for Patent Application No. PCT/GB2012/052402, mailed on Apr. 10, 2014, 8 pages.

International Search Report and Written Opinion of The International Searching Authority received for Patent Application No. PCT/GB2012/052402, mailed on Dec. 6, 2012, 12 pages.

GB Intellectual Property Office Search Report under Section 17(5) received for GB Patent Application No. 1116958.8, mailed Dec. 15, 2011, 3 pages.

Furgale et al., "Visual Teach and Repeat for Long-Range Rover Autonomy," Journal of Field Robotics, vol. 27, No. 5, Sep. 1, 2010, pp. 534-560.

Lategahn, et al., "Visual SLAM for Autonomous Ground Vehicles," IEEE International Conference on Robotics and Automation, May 9-13, 2011, 6 pages.

Royer et al., "Monocular Vision for Mobile Robot Localization and Autonomous Navigation," International Journal of Computer Vision, Kluwer Academic Publishers, BO, vol. 74, No. 3, Jan. 13, 2007, pp. 237-260.

Scaramuzza, et al., "Exploiting Motion Priors in Visual Odometry for Vehicle-Mounted Cameras with Non-holonomic Constraints," IEEE/RSJ International Conference on Intelligent Robots and Systems, Sep. 25-30, 2011, 8 pages.

Segvic, et al., "A mapping and localization framework for scalable appearance-based navigation," Computer Vision and Image Understanding, Academic Press, US, vol. 113, No. 2, Feb. 1, 2009, pp. 172-187.

Tomasi, et al., "Shape and Motion from Image Streams Under Orthography: A Factorization Method," International Journal of Computer Vision, Kluwer Academic Publishers, Norwell, US, vol. 9, No. 2, Nov. 1, 1992, pp. 137-154.

International Preliminary Report on Patentability received for Patent Application No. PCT/GB2012/052398, mailed on Apr. 10, 2014, 8 pages.

International Search Report and Written Opinion of the International Searching Authority received for Patent Application No. PCT/GB2012/052398, mailed on Dec. 6, 2012, 13 pages.

GB Intellectual Property Office Search Report under Section 17(5) received for GB Patent Application No. 1116960.4 mailed Jul. 6, 2012, 3 pages.

Stewart, et al., "LAPS—Localisation using Appearance of Prior Structure: 6DoF Monocular Camera Localisation using Prior Pointclouds," IEEE International Conference on Robotics and Automation, RiverCentre, Saint Paul, Minnesota, May 14-18, 2012, pp. 2625-2632.

(56) References Cited

OTHER PUBLICATIONS

Viola, et al., "Alignment by Maximization of Mutual Information," International Journal of Computer Vision, Kluwer Academic Publishers, vol. 24, No. 2, Sep. 1, 1997, pp. 137-154.

Wulf, et al., "Robust Self-Localization in Industrial Environments based on 3D Ceiling Structures," IEEE International Conference on Intelligent Robots and Systems, Oct. 9-15, 2006, Beijing, China, pp. 1530-1534.

Spoerri, Anselm, "Novel Route Guidance Displays", Department of Civil Engineering, Massachusetts Institute of Technology, IEEE Vehicle Navigation & Information Systems Conference, Oct. 1993, Ottawa, Canada, 0-7803-1235-X93, pp. 419-422, 4 pages.

Scott-Young, Stephen, "Seeing the Road Ahead: GPS-Augmented Reality Aids Drivers", The University of Melbourne, GPS World Magazine, Nov. 1, 2003, vol. 2003, vol. 14, Issue No. 11, Advanstar Communications, Inc., Accession No. 00968694, 2 pages.

\* cited by examiner

402 — Receive data from LIDAR

404 — Use the LIDAR data to generate a new 3D point cloud of the environment

406 — Obtain data representing an existing 3D point cloud

408 — Seek to match the new 3D point cloud within the existing 3D point cloud in order to localise the vehicle

LOCALISING TRANSPORTABLE APPARATUS

The present invention relates to improvements in localising transportable apparatus within an environment.

It is desirable to precisely localise a vehicle in an environment, which can assist with goals, such as autonomy. Accurate localisation conventionally requires a 3D map of the environment, which requires an expensive 3D laser to generate, typically in combination with Differential Global Positioning System (DGPS) or integrated inertial systems. It is not always feasible from a cost perspective to include such complex components in vehicles and there can also be problems related to the operating envelope of such systems, particularly in areas deprived of good DGPS reception. Further, simple 2D scan matching does not suffice due to combinations of roll and pitch, ground strike and grazing effects from hedgerows, verges, cambers and slopes.

Laser-based outdoor localization of road vehicles using prior maps has been previously addressed by several authors. Levinson et. al. (in J. Levinson, M. Montemerlo, and S. Thrun, "Map-based precision vehicle localization in urban environments," in Proceedings of the Robotics: Science and Systems Conference, 2007) utilized a Velodyne laser sensor fused with GPS, IMU and odometry data to generate a precise offline map, which is then used in conjunction with a particle filter to estimate position. This approach required an expensive, actuated sensor and offline relaxation. The same authors extended this work in J. Levinson and S. Thrun, "Robust vehicle localization in urban environments, using probabilistic maps," in Robotics and Automation (ICRA), 2010 IEEE International Conference on IEEE, 2010, pp. 4372-4378, where they developed a long-term probabilistic framework, again employing a Velodyne.

Kummerle et. al. (in R. Kummerle, D. Hahnel, D. Dolgov, S. Thrun, and W. Burgard, "Autonomous driving in a multi-level parking structure," in Robotics and Automation, 2009. ICRA'09, IEEE International Conference on IEEE, 2009, pp. 3395-3400) developed an autonomous system that utilizes multi-level surface maps obtained from a Velodyne to represent the environment with a 2.5D structure. In F. Moosmann and C. Stiller, "Velodyne slam" in Intelligent Vehicles Symposium (IV), 2011 IEEE, pp. 393-398, the Velodyne was utilised in a SLAM framework. The authors of Y. Morales, T. Tsubouchi, and S. Yuta, "Vehicle localization in outdoor mountainous forested paths and extension of two-dimensional road centerline maps to three-dimensional maps," Advanced Robotics, vol. 24, no. 4, pp. 489-513, 2010 utilized a 2D road network map and a laser in conjunction with a Differential GPS-enabled receiver to estimate pose. Again, this approach required an expensive, calibration-intense device (such as the Velodyne) or continuous (or almost continuous) GPS data in order to conduct long-term navigation.

In M. Bosse and R. Zlot, "Map matching and data association for large-scale two-dimensional laser scan-based slam," The International Journal of Robotics Research, vol. 27, no. 6, p. 667, 2008, the authors utilized a robust Iterative Closest Point (ICP) algorithm (see P. Besl and N. McKay, "A method for registration of 3-d shapes," IEEE Transactions on pattern analysis and machine intelligence, pp. 239-256, 1992) to perform local scan-matching, and incorporate a histogram feature representation to match local submaps. In M. Bosse and R. Zlot, "Continuous 3d scan-matching with a spinning 2d laser," in Robotics and Automation, 2009. ICRA'09. IEEE International Conference on. IEEE, 2009, pp. 4312-4319) the same authors utilized a rotating, scanning laser in order to generate 3D point-clouds maps.

Embodiments of the present invention are intended to address at least some of the problems discussed above. Embodiments can provide a method for precisely localising a road vehicle using a single push broom 2D laser scanner while leveraging a prior 3D survey. Embodiments of the method produce a small 3D swathe of laser data which can be matched statistically within the 3D survey. The swathe generation can be predicated upon time varying estimates of vehicle velocity.

According to a first aspect of the present invention there is provided a method of localising transportable apparatus within an environment, the method including or comprising:

receiving data obtained from a ranging sensor device of the transportable apparatus configured to collect information relating to at least a surface over which the transportable apparatus is moving in an environment;

using the ranging sensor device data to generate a new 3D point cloud of the environment;

obtaining data representing an existing 3D point cloud of at least part of the environment, and seeking to match the new 3D point cloud with, or within, the existing 3D point cloud in order to localise the transportable apparatus with respect to the existing point cloud.

The ranging sensor device may comprise a LIDAR device. In use, a beam of the LIDAR device may be aimed to continually (although in some cases, short intervals between beam transmission are possible) strike the surface whilst the transportable apparatus is moving. The LIDAR device may be declined at an angle in a range of around 10° to 90° with respect to a main horizontal axis of the transportable apparatus.

The method may reconstruct motion of the transportable apparatus during a period when the ranging sensor device data was created to generate the new 3D point cloud. The method may use information regarding linear and rotational velocities of the transportable apparatus during the period to generate the new 3D point cloud.

The ranging sensor device can include a clock configured to provide timing information relating to the information relating to at least the surface.

The information regarding rotational velocity may be obtained from a rotational velocity measuring device, e.g. a gyroscope, the rotational velocity measuring device including a clock to provide timing information relating to the rotational velocity information.

The information regarding linear velocity may be obtained from a linear velocity measuring device, e.g. a speedometer, configured to provide information relating to linear velocity of the transportable apparatus, the linear velocity measuring device including a clock to provide timing information relating to the linear velocity information.

The method may include calibrating the clock of the ranging sensor device, the clock of the linear velocity measuring device and the clock of the rotational velocity measuring device in order to coordinate information provided by those devices in terms of timing. The calibrating may involve computing probabilistic mappings between the clocks. The probabilistic mappings may be computed using a TICSync timing algorithm.

The method may include adjusting the velocity information provided by the linear velocity measuring device in view of a bias factor. The method may include computing the bias factor and the computing of the bias factor can include:

scaling observed velocity information over a test section of the environment;

generating a scaled 3D point cloud for the test section;

attempting to align the scaled 3D point cloud with a part of the existing 3D point cloud corresponding to the test section, and using information relating to the attempted alignment to compute the bias factor.

Alternatively, the computing of the bias factor can include:

analysing the ranging sensor data to identify a first set of repeated features in the environment;

analysing the existing 3D point cloud data to identify a second set of repeated features;

computing a warping function to align the first set of repeated features and a second set of repeated features, and using the warping function to determine the bias factor.

The computing of the warping function may involve a Dynamic Time Warping technique.

The repeated feature may comprise road markings.

The seeking to match step may comprise computing a transformation between the new point cloud and the existing point cloud. The computing of the transformation may include:

generating a probability distribution representing the new point cloud;

generating a probability distribution representing the existing point cloud;

comparing the new point cloud probability distribution with the existing point cloud probability distribution.

The comparing step may involve computing a Kullback-Leibler divergence value between the new point cloud probability distribution and the existing point cloud probability distribution. The Kullback-Leibler divergence value may be used to compute an objective function f:

$$f(\mathcal{P}, \mathcal{Q}) = \sum_{i=1}^{N} \mathcal{H}(\mathcal{Q})(i) \log \frac{\mathcal{H}(\mathcal{Q})(i)}{\mathcal{H}(\mathcal{P})(i)}$$

where P represents the existing point cloud probability distribution, Q represents the new point cloud probability distribution, H(•) represents a histogramming operation, N represents cardinality of a said probability distribution and I is an iterator over bins.

The computing of the transformation can involve seeking a said transformation that brings the new point cloud probability distribution and the existing point cloud probability into optimal alignment by minimising the objective function f.

The existing 3D point cloud may have been created using data from at least one previous data capture survey.

According to another aspect of the present invention there is provided a method of localising a land vehicle comprising steps of:

moving the vehicle along a route for which a 3D laser scan exists;

positioning a 2D laser scanner on the vehicle whereby to direct its scan downwardly to strike the ground;

whilst the vehicle is traversing the route, operating the 2D laser scanner to scan the ground whereby to produce a 3D swathe of laser data, and statistically comparing the said 3D swathe of laser data with the laser data from the said 3D laser scan whereby to localise the vehicle.

The lasers may comprise LIDARs. The 3D swathe of laser data can be estimated by integrating estimates of the vehicle motion. The 3D swathe may be continually aligned with the data from the 3D laser scan by considering and matching the population statistics thereof.

The method may include calibrating the vehicle velocity by detecting the passage of road markings or other regularly spaced markings by means of the 2D laser scanning and then deducing a warping between a detected reflectance signal and a reflectance signal predicted by the 3D laser scan.

The method may be used for localisation of the sensor device (and/or a transportable apparatus in/on which it is carried, e.g. a vehicle). Alternatively, the method may be used for object tracking.

According to another aspect of the present invention here is provided a method of calibrating a clock of a ranging sensor device of a transportable apparatus and at least one clock of at least one corresponding velocity measuring device of the transportable apparatus substantially as described herein.

According to another aspect of the present invention there is provided transportable apparatus including a ranging sensor and a processor configured to execute a method substantially as described herein.

According to yet another aspect of the present invention there is provided a vehicle including transportable apparatus substantially as described herein.

According to other aspects of the present invention there are provided computer program elements comprising: computer code means to make the computer execute methods substantially as described herein. The element may comprise a computer program product.

According to other aspects of the present invention there is provided apparatus including a processor configured to execute methods substantially as described herein.

Whilst the invention has been described above, it extends to any inventive combination of features set out above or in the following description. Although illustrative embodiments of the invention are described in detail herein with reference to the accompanying drawings, it is to be understood that the invention is not limited to these precise embodiments.

Furthermore, it is contemplated that a particular feature described either individually or as part of an embodiment can be combined with other individually described features, or parts of other embodiments, even if the other features and embodiments make no mention of the particular feature. Thus, the invention extends to such specific combinations not already described.

The invention may be performed in various ways, and, by way of example only, embodiments thereof will now be described, reference being made to the accompanying drawings in which.

Figure 1:
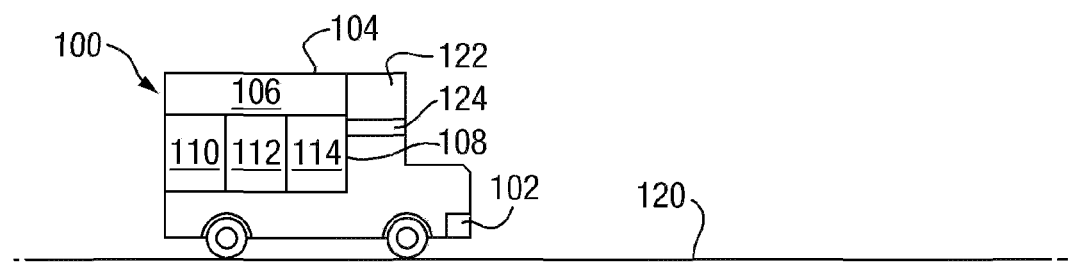
FIG. 1 is a schematic illustrating of transportable apparatus within an environment.

FIG. 1 shows schematically a transportable apparatus in the form of a vehicle 100 that is fitted a sensor 102. In the illustrated embodiment the sensors is a LIDAR device, but it will be understood that it could be replaced by any suitable ranging sensor (e.g. a laser scanner or sonar device) that is capable of producing an accurate 3D swathe and map. The vehicle further includes a computing device 104 having a processor 106 and memory 108. The computing device is in communication with the sensor 102 (e.g. via a wireless communications interface) and is capable of storing and processing data 110 relating to signals received from it using an application 112.

The memory 108 further includes existing map data 114 that normally comprises a 3D point cloud of an environment. Typically, the existing map data will have been generated using data collected by at least one previous survey of the environment using a similar vehicle equipped with sensors and computing device. The computing device 104 may further include other conventional features, such as a user interface and a communications interface that allows it to exchange data with remote devices. In alternative embodiments, signals from at least one of the sensors may be transferred to a remote computing device for processing rather than being processed by an on board computing device.

In use, the vehicle 100 travels along a surface 120 and the sensor 102 captures data relating to the scene around and below the vehicle. Although the example vehicle is a land-based vehicle travelling along a road/ground surface, it will be appreciated that in alternative embodiments, the vehicle could be any type of vehicle that may be travelling above (and not necessarily in contact with) a surface that can be scanned. Further, in other embodiments, the sensor and the computing device need not be fitted to/on a vehicle, but can be included in a hand-held navigation device, for example.

The application 112 is configured to process data received from the sensor 102 in order to attempt to localise the vehicle 100 with respect to the existing map data 114. The application uses the data obtained from the sensor to produce a run-time generated 3D point cloud, or swathe, 116 (designated Q in the detailed discussion below) and then seeks to match this within the existing 3D point cloud 114 (designated P below) of an environment that is believed to include the environment through which the vehicle is currently moving. The existing 3D point cloud will normally be generated using data obtained during previous surveys (see discussion on experience data below).

In contrast to conventional scan matching, the sensor 102 is oriented downwards to seek out ground strike with the surface 120. In general, the beam emitted by the first LIDAR device can have a declination between around 10°-90°. Although the sensor is depicted as being located on the front portion of the vehicle in FIG. 1, it will be understood that the position on the vehicle could be varied.

By integrating estimates of the motion of the vehicle 100, it is possible for the application 112 to generate a 3D swathe of laser data using the data 110 provided by the sensor 102. This dense "recent history" can be continually aligned with the existing 3D point cloud data 114 by considering and matching the population statistics of the swathe and survey patch. The problem now is how to estimate vehicle motion. A device such as a Triaxial MEMSense™ gyroscope (illustrated graphically as 122 in FIG. 1) can be a cheap way to estimate angular velocity with good accuracy. However, an accurate linear velocity profile is more difficult to obtain. A road vehicle's speedometer (illustrated graphically as 124) typically overestimates velocity and so embodiments can perform a calibration of the velocity feed. In some embodiments this is done online by detecting the passage of road markings through a fan of laser sweeps and then recovering vehicle velocity by deducing (by dynamic programming) a warping between a detected reflectance signal and that predicted given the prior survey.

Figure 2:
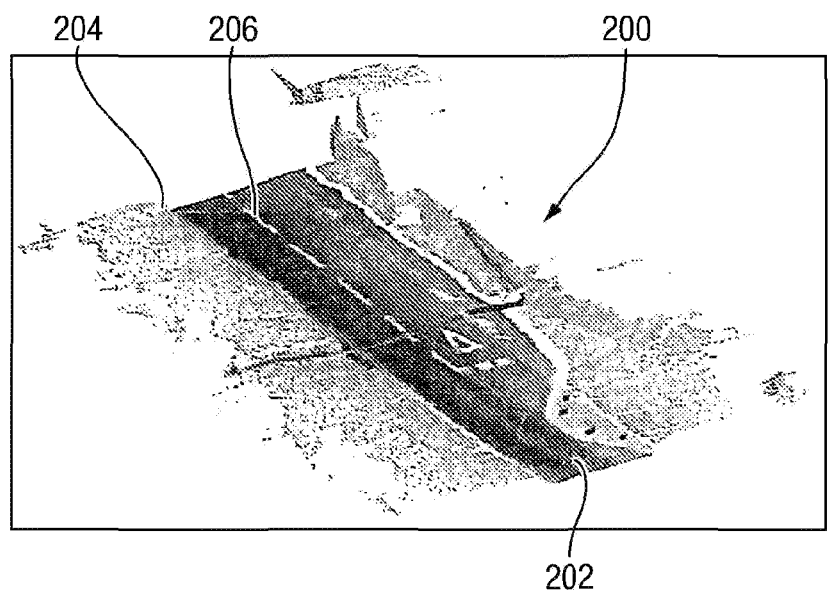
FIG. 2 is a perspective view of a laser scan taken by a vehicle moving through an environment.

FIG. 2 shows a perspective view of a single scan of the declined 2D laser 102 (in laser-light) as the vehicle 100 moves through a section of an environment 200 and produces a swathe (motion is upper-left to lower-right). The highlighted scan clearly shows how this orientation captures the relief of the road 202 and surrounding verges 204 of the vehicle. The swathe has been shaded using the reflectance data gathered by the 2D scans. As expected, the highly-reflective (by design) road markings 206 can be clearly seen. As will be discussed below, this signal can be exploited by some embodiments in order to deduce vehicle velocity and a bias term in the speedometer readings.

The application 112 can use a stream of the 2D laser data to deduce vehicle motion. It also serves to illustrate the kind of detail that can be acquired with careful calibration and timing and shows the highly-reflective road markings that are clearly visible in laser-light. FIG. 2 illustrates how successive declined views can be accumulated to produce a detailed local view of the environment 200. The Figure also highlights that a single 2D scan will be insufficient to localise the vehicle— there being an obvious forwards backwards ambiguity despite the marked curbside relief.

The survey performed by the vehicle 100 passing through the environment 200 is referred to herein as an "experience", and can be comprised of laser-sweeps, poses, and velocities, both angular and linear. (A discussion of data collection and processing relating to experiences can be found in UK Patent Application No. 1202344.6 filed on 10 Feb. 2012; applicant: Isis Innovation Limited; title: "Method of Locating a Sensor and Related Apparatus", the contents of which are hereby incorporated by reference). This terminology emphasizes that embodiments do not need a globally correct metric map for the road localisation task. In some cases, it is sufficient to localize the vehicle with respect to the trajectory and a point-cloud defined by a prior experience—which can be the case with a drive around urban roads. This does not preclude the case of localizing against a trajectory that is metrically perfect—having been massaged by a global optimisation with loop closures, etc—but it is the case that not all embodiments require that degree of preparation.

The present inventors assume that survey vehicle motion estimates have been used to produce the existing 3D point-cloud, which is termed P. The task to be performed by the application 112 is to localize the vehicle with respect to the trajectory and point-cloud—defined by this prior experience—with the run-time point-cloud, Q. At run-time, the application has access to LIDAR data from the sensor 102.

Figure 3:
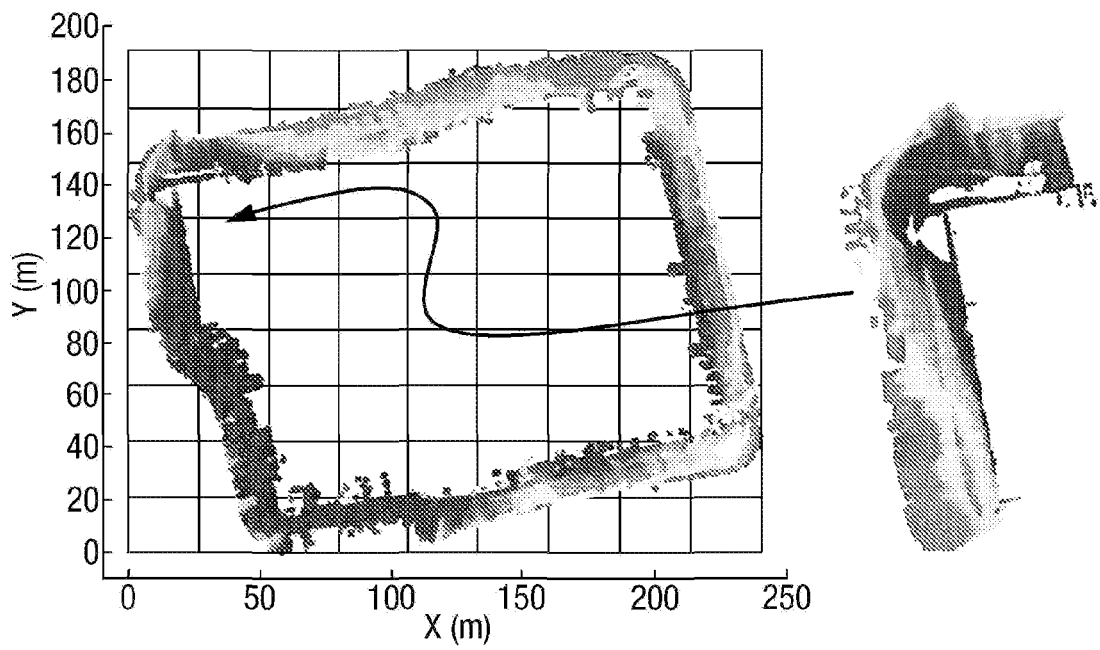
FIG. 3 is an overhead view of an example 3D point cloud.

FIG. 3 shows an overhead view of the 3D point-cloud P developed during the experience (overlaid on an example environment), alongside an exemplar swathe, Q, produced by developing the motion of the vehicle 100 over a retrospective window $[t_k, t_{k-N}]$ (where N is the window length, in seconds). The original experience is shown on the left. Points are shaded by height, with darker tones being lowest, and lighter tones highest. Shown on the right is an example swathe, Q. The tracking problem addressed by the application 112 is: given the point-cloud P, and the swathe developed during runtime, Q, to establish a transformation, T, that best aligns the point clouds. Alternative ways of matching the point clouds instead of computing the transformation are possible, such as building a robust feature identifier, and then matching corresponding features in the run-time swathe and the existing map in order to determine the current position.

Figure 4:
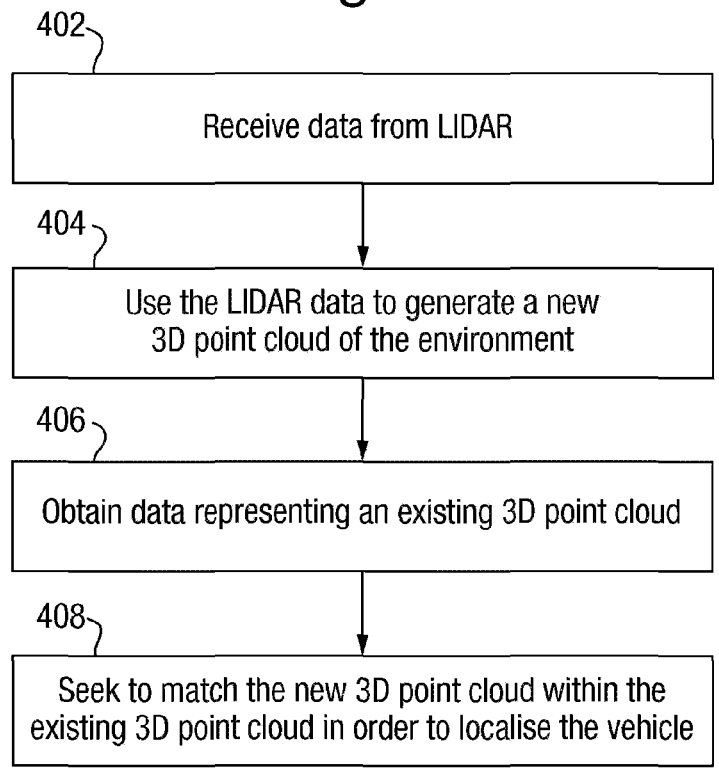
FIG. 4 is a flowchart showing steps performed by an example embodiment.

FIG. 4 illustrates schematically an example of this method. The skilled person will appreciate that the steps are exemplary only and that in alternative embodiments, some of them may be omitted and/or re-ordered. Further the method can be implemented using any suitable programming language and data structures. At step 402, data relating to signals produced by the LIDAR device 102 is received by the application 112 executing on the computing device 106. It will be appreciated that the format and presentation of the data used by the application can vary.

In order perform localisation, at step 404 the application 112 generates the swathe Q at runtime by reconstructing the motion of the vehicle 100 over the windowing period. A laser-scan at time t is defined as:

$$s(t) = \{r_1, \ldots, r_{541}, i_1 \ldots i_{541}\} \quad (1)$$

where $r_n$ denotes the laser range reading (in meters) for beam n of scan s(t), $i_n$ is the intensity of the beam, and $S = \{s(1), \ldots, s(n)\}$ is a collection of such scans. In addition it is observed, through the gyroscope, the rotational velocities w(t) around the three ordinate axes of the vehicle (roll, pitch, yaw).

Given the rotational velocities and the forward velocity of the vehicle, it is possible to integrate the state equation:

$$\dot{x}(t) = v(t) \begin{bmatrix} \cos\left(\int_{t_0}^{t} \omega_z(t) dt\right) \\ \sin\left(\int_{t_0}^{t} \omega_z(t) dt\right) \\ \sin\left(\int_{t_0}^{t} \omega_x(t) dt\right) \end{bmatrix} \quad (2)$$

to produce the SE2 pose x(t). It is then possible to project the laser data points S(t) from x(t), thereby generating the swathe Q. The method should ensure very accurate time synchronisation between gyroscope and laser, which will be discussed below. Furthermore, there is a dependence on vehicle velocity v.

At step 406 data relating to an existing 3D point cloud, P, representing the environment is obtained. This will normally be the same format as the run-time point cloud Q, but it will be appreciated that this need not always be the case and data conversion routines could be performed in order to carry out the subsequent processing steps.

Once the swathe Q has been developed over the window period, the alignment with the existing point-cloud P needs to be determined and at step 408, the application 112 seeks to match the run-time point could Q with, or within, the existing point cloud P in order to try to localise the vehicle. The existing point cloud P will normally comprise a larger data set than the swathe Q; however, in some cases, only a portion of the existing point cloud may be processed at one time. Further details of the localization procedure can be found in the UK patent application no. 1202344.6 referenced above.

In one embodiment the application 112 attempts to match the point cloud Q within the point cloud P by seeking the transformation T^ that brings the point-clouds P and Q into optimal alignment by minimizing an objective function f $$\hat{\mathcal{T}} = \underset{\mathcal{T}}{\operatorname{argmin}} f(\mathcal{P}, \omega, \upsilon, \mathcal{T}) \quad (3)$$

The swathe, referenced within the survey, is a function of angular rotation rate profiles, velocity profile, laser scans and the SE2 transformation that is being sought. Its generation can be factored as:

$$Q \mapsto g(w, v, S) \cdot T \quad (4)$$

where Equation 4 above develops the swathe point-cloud Q, and applies the transformation T to project it into the global frame. Both P and Q are distributions of points in space. The Kullback-Leibler divergence offers a way to compare two such distributions and forms the basis of the objective function f.

The notation H(•) is used to represent the histogramming operation applied to a set of points. Applying this operation to the survey and swathe, the KL-divergence between hypothesized swathe (a function of T) and the survey is:

$$f(\mathcal{P}, Q) = \sum_{i=1}^{N} \Box Q(i) \log \frac{\Box Q(i)}{\Box \mathcal{P}(i)} \quad (5)$$

where N is the cardinality of the distribution and i is an iterator over bins. Note that if only a translation and rotation are required then it is possible to project points down into the global XY plane in order to generate the histograms.

Representing the point-clouds by their projected probability distributions is one way of capturing the structure of the environment. Prismatic structures, such as walls, are represented by a higher density as they are observed more often. Points on the ground have a naturally lower density, but are still informative about the shape and structure of the road. Using this approach, the KL divergence can be used to represent the distance between these distributions, provided that they are well defined.

To prevent infinite divergences the application 112 absolute discounting to the probability distributions P and Q obtained by counts, with the sets of non-zero bins defined as $S_P$ and $S_Q$ respectively, the smoothed probability distribution P is defined as:

$$P(i) = \begin{cases} P(i) - \epsilon & \text{if } i \in S_P \\ \epsilon & \text{otherwise for } i \in S_P \setminus S_Q \end{cases} \quad (6)$$

Absolute discounting apportions some of the probability mass from the distribution into bins that have observed samples under one distribution, but not the other. This is necessary in order for the divergence measure to be properly defined. A discrete Gaussian convolution is then applied to both P and Q during the optimization procedure:

$$P'(x, y) = P(x, y) * g(x, y) \quad (7)$$

$$= \sum_{n_1 = -\infty}^{\infty} \sum_{n_2 = -\infty}^{\infty} P(n_1, n_2) \cdot g(x - n_1, y - n_2) \quad (8)$$

and similarly for Q, where g(x,y)=N(0,σ). This operation contributes significantly to the smooth nature of the cost function (discussed below).

Algorithm 1 below details the described optimization procedure. The algorithm takes, as input the survey experience point cloud data P, a candidate swathe Q and an initial estimate of the desired transformation $T_{guess}$ (an SE2 pose).

| Algorithm 1 Cost function optimization |
| --- |
| 1:     procedure SOLVEFORTRANSFORMATION(P, Q, $T_{guess}$) |
| 2:         c ← $c_{init}$ |
| 3:         δ ← ∞ |
| 4:         T ← $T_{guess}$ |
| 5:         while δ > TOL do |
| 6:            $cost_{min}$ ← ∞ |
| 7:            P ← H(P, c) |
| 8:            P' ← P * N(0, σ) |
| 9:            H ← BuildHistogramFilter(T) |
| 10:        for $\hat{T}$ in H do |
| 11:            cost ← KL(H(Transform(Q, $\hat{T}$), c), P) |
| 12:            if cost < $cost_{min}$ then |
| 13:                T ← $\hat{T}$ |
| 14:            end if |
| 15:        end for |
| 16:        δ ← ‖T − $T_{guess}$‖ |
| 17:        c ← c + $c_{delta}$ |
| 18:     end while |
| 19:     return(T) |
| 20:   end procedure |

The histogram granularity, c is initialized to a default value, and the halting criterion for the optimization set to infinity. Line 7 makes use of the histogramming operation to produce a discrete probability density function (pdf) of the input point-cloud data with the number of bins determined by the second parameter. Line 11 defines the cost function used in the optimization procedure. This function takes as input two probability distributions, and returns the KL-divergence between them.

The granularity is increased by a quantity $c_{delta}$ at every iteration (Line 17), to provide an annealing effect. The halting measure, δ, is the difference between the previous SE2 estimate and the current estimate, and the optimization halts once this measure has reached a predefined value. The difference between the two poses is measured as given by the metric in S. LaValle, Planning algorithms. Cambridge Univ Pr, 2006, ch. 5: Sampling-based Motion Planning, p. 189, in which the orientation in a SE2 pose is expressed with a complex number representation.

$$T \rightarrow (x_t, y_t, a, b) \in \mathbb{R}^4 \qquad (9)$$

where a and b are the complex components of the angle. The Euclidean metric is valid for comparing two poses in SE2.

At the next discrete interval, the application 112 will have observed more rotational and linear velocity data, and requires a pose seed for Algorithm 1 to initiate the search procedure. To obtain this estimate, the velocities are applied, through the system state equations, to $x(t_k-1)$ which is then used as a pose guess.

As mentioned above, the timing calibration between the time as perceived by the clocks on-board the gyroscope, the laser sensor, and the speedometer is important. Disagreement between these clocks will result in point-clouds that exhibit "smear", which can flatten the objective function making optimization harder. Embodiments of the system can use the known TICSync timing algorithm (see A. Harrison and P. Newman, "Ticsync: Knowing when things happened," in Proc. IEEE International Conference on Robotics and Automation (ICRA2011), Shanghai, China, May 2011, 5), which learns a probabilistic mapping between clocks, and is able to recover both skew and offset.

Figure 5:
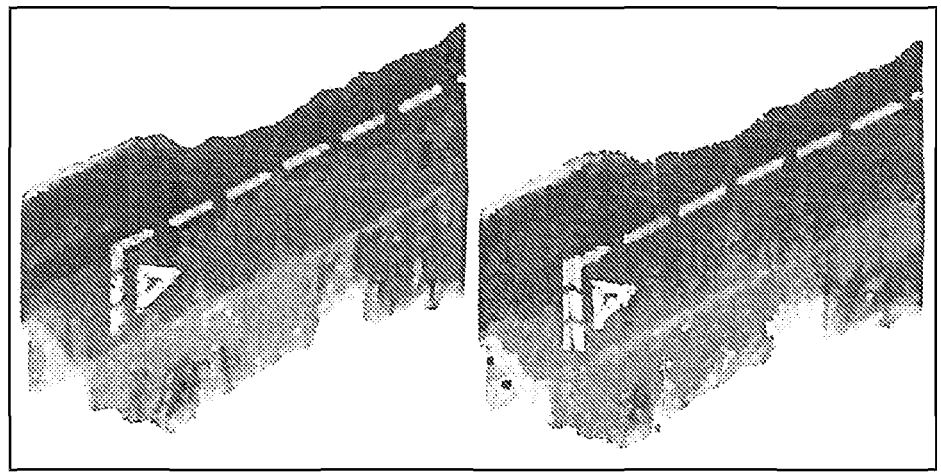
FIG. 5 is an overhead view of an environment including road markings.

FIG. 5 shows TICSync-corrected data (left hand side), and the same data with a normally distributed 50 ms error in timing (right hand side). Visible in the right hand of the Figure is the ghosting in laser-space that increases with increased timing error.

Up until this point it has been assumed that all of the terms on the right hand side of the Equation 4 are known −v(t) in particular being taken from the on board vehicle speedometer. In general, vehicle speedometers are calibrated to over-estimate the vehicle speed, and so it is desirable to compensate for a constant bias term. As such, calibration processes will be described below, which attempt to recover the bias factor from the observed velocity data. The cost function discussed below can be made into a function of unknown velocity bias. In this process, this factor will be estimated by scaling the observed velocities over a test section and generating correspondingly scaled candidate point-clouds Q. The calibration task is then to find the transformation T and bias T that will produce the best alignment with the reference cloud P:

$$\underset{\mathcal{T}, \tau}{\mathrm{argmin}} f(\mathcal{P}, \omega, \upsilon, \mathcal{T}, \tau) \qquad (10)$$

Figure 6:
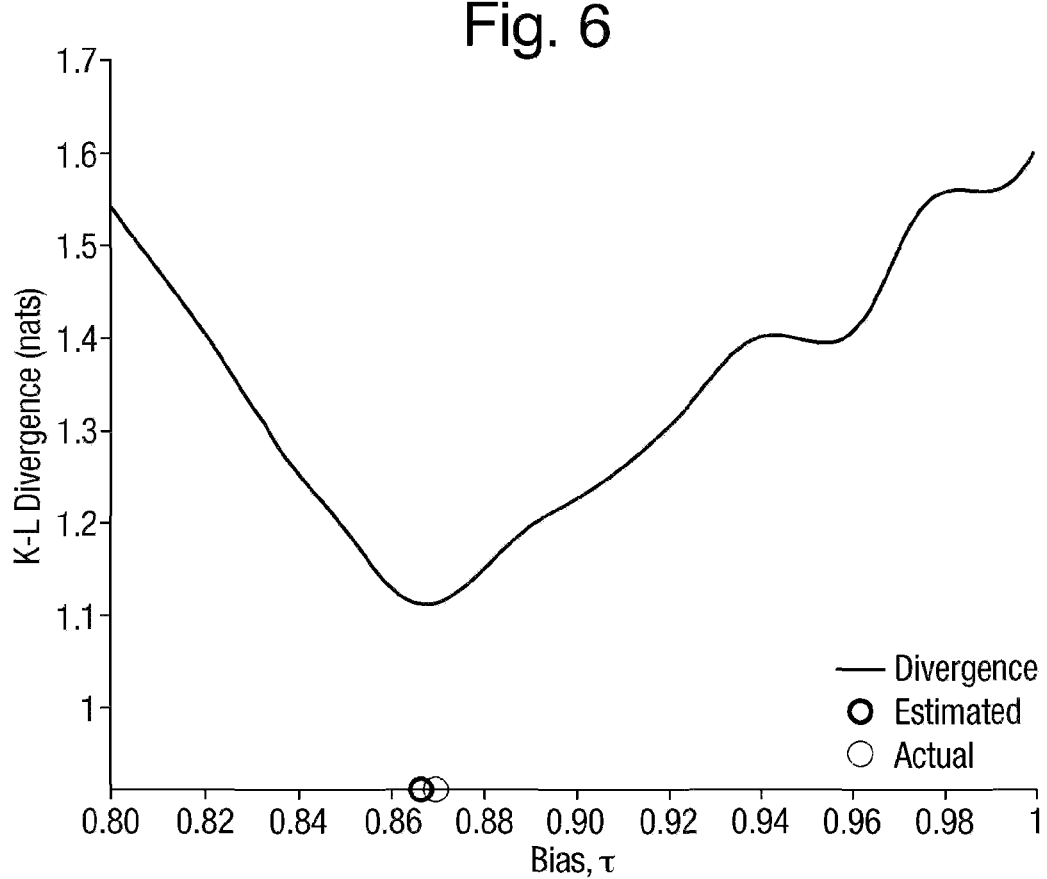
FIG. 6 illustrates the results of calibration of a speedometer.

FIG. 6 shows the results of this process. The ground truth velocities are intentionally corrupted with a known bias and the above procedure is used to estimate the correcting factor. For these results, the true bias was set at 1.15, and therefore the value required to compensate for this over-estimate is ~0.87 (left-hand circle on bias axis; actual is shown in right-hand circle). The estimated correction factor of 0.865 was used in the analysis, which shows that despite the resulting velocity error, it can still track successfully over 26 kilometers of data. It should be noted that this calibration technique only works when driving at a constant velocity, which is somewhat prescriptive.

Figure 7:
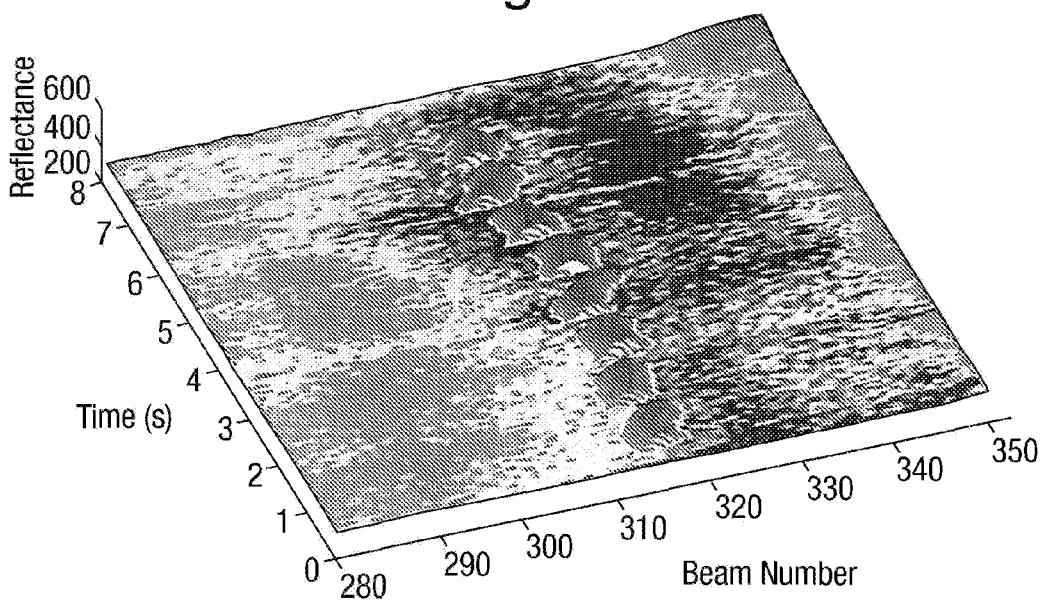
FIG. 7 illustrates example laser reflectances plotted against time.

In alternative embodiments another approach is used (which might help do away with requiring a velocity feed at all) that can dispense with the need to drive at a constant speed. Furthermore, this alternative approach offers the opportunity to refine the calibration continually over the lifetime of the vehicle. This approach involves inferring the velocity of the vehicle from the passage of environmental cues and hence to form the bias estimate. Many roads are replete with features specifically designed to be highly visible. As can be seen in FIG. 7—an intensity plot of the per-beam laser reflectances against time—the road markings are highly-visible features in laser light (lighter shades are less reflective; darker more reflective). Given the repeatability of these features, and the fact that they tend to occur in similar regions in beam space (angular position in the scan), they can be used to conveniently track the signal over time.

Figure 8:
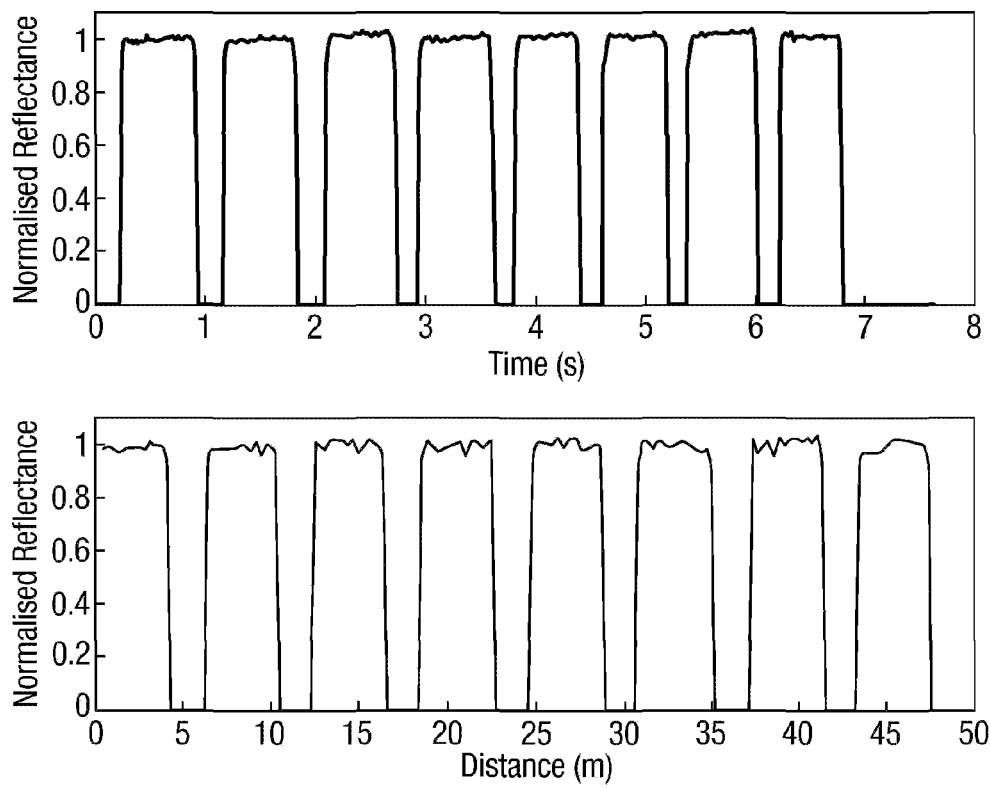
FIG. 8 shows graphs illustrating normalised reflectance values of road markings.

FIG. 8 (top graph) shows a 1D representation of the (normalized) intensity values shown in FIG. 7. This signal is observed during the generation of swathe Q. FIG. 8 (bottom graph) shows the normalized intensity of centre-lane divides in the experience point-cloud P along a spline model of the centre-line of an example road network. The warping function that aligns these two signals is the velocity of the vehicle.

Figure 9:
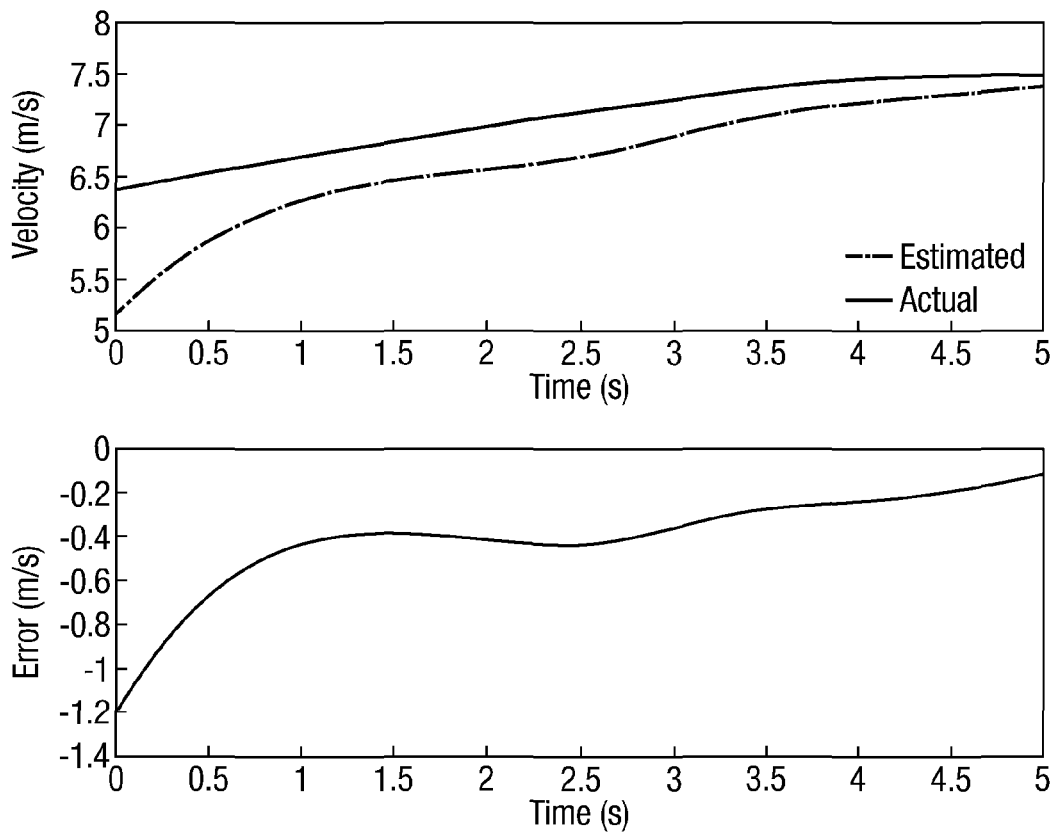
FIG. 9 shows graphs illustrating estimated and true velocities recorded over part of an example environment.

To extract this warping function, the method can use Dynamic Time Warping (see H. Strik and L. Boves, "Averaging physiological signals with the use of a DTW algorithm," Proceedings SPEECH, vol. 88, no. 7, pp. 883-890, 1988), a known technique in speech-analysis for comparing audio signals. Given two signals, $x \in (x_1, \ldots, x_N)$ and $y \in (y_1, \ldots, y_N)$, the distortion between the signals $D(x,y)$ is based on a sum of local distances between elements $d(x_i, y_i)$, with the optimal alignment minimizing the distortion. This is posed as a minimization problem:

$$\mathcal{D}_\Phi(x, y) = \min_\Phi \frac{1}{K_\Phi} \sum_{k=1}^{K_\Phi} d(x_{\Phi_l}(k), y_{\Phi_r}(k)) \quad (11)$$

that is solved with a dynamic-programming approach. $K_\phi$ represents the warping distance of path $\phi$. Having estimated the distortion, it is possible to align the signals, determining the timing correspondence over the lane markers, hence inferring the velocity. FIG. 9 shows the results of applying this procedure over the data shown in FIG. 7. The ground-truth velocity is shown in the top graphs in solid line, with the estimated velocity in dotted line. Even with these relatively coarse markers, the estimated velocity tracks the true velocity. The lower graph illustrates the error in the velocity estimation over this swathe.

Due to the current modest declination of the laser in some embodiments, it is not feasible to use this approach to infer velocity around areas of high curvature—the tracking becomes troublesome. However, as it stands, the method demonstrates quantifiably good localisation with just a single push-broom laser. Results are presented below.

In order to evaluate the performance of the localization procedure, some method of comparing the resultant trajectories with those of the INS system is required (which itself can be in substantial error). This is defined as a displacement function, for which pose x(t) is defined to be:

$$\delta(x(t)) = \|x(t) - \hat{x}_e\| \quad (12)$$

where $x_e$ is the closest pose of the trajectory in the survey loop, as measured by the metric in S. LaValle, Planning algorithms. Cambridge Univ Pr, 2006, ch. 5: Sampling-based Motion Planning, p. 189. This displacement will capture both the true deviation from trajectory to trajectory in addition to the localization error. If data processed by the method corresponded to exactly the same route traversed by the survey vehicle that produced the existing 3D point cloud, this displacement would be at zero. However, as the exact same route is never traversed twice, it is expected that—in a well behaved system—the displacement will be well bounded.

Figure 10:
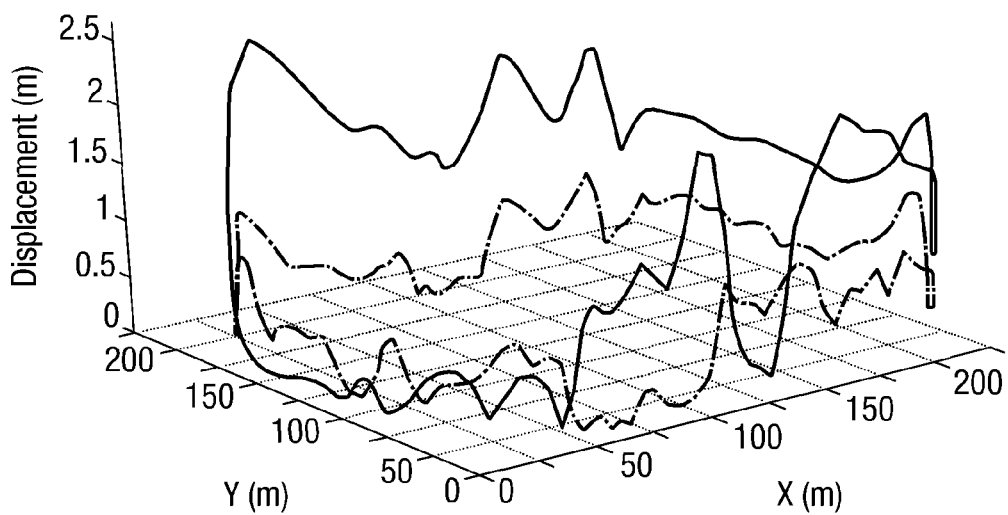
FIG. 10 is a graph illustrating relative displacement relating to test data.

FIG. 10 depicts this displacement function for the INS and the localization procedure for the same loop, as measured against the reference trajectory. Relative displacement of both the localization procedure (shown in dotted line) and the INS (solid line) as measured against the experience data over the test site. As can be seen from the Figure, the displacement for both the INS and the localization procedure are bounded; however, the average displacement over the trajectory is substantially lower for the present method, as compared to the INS. The areas in which the INS exhibits a large deviation (particularly the northern and southern sections) are results of the paucity of GPS signal in those regions.

Figure 11:
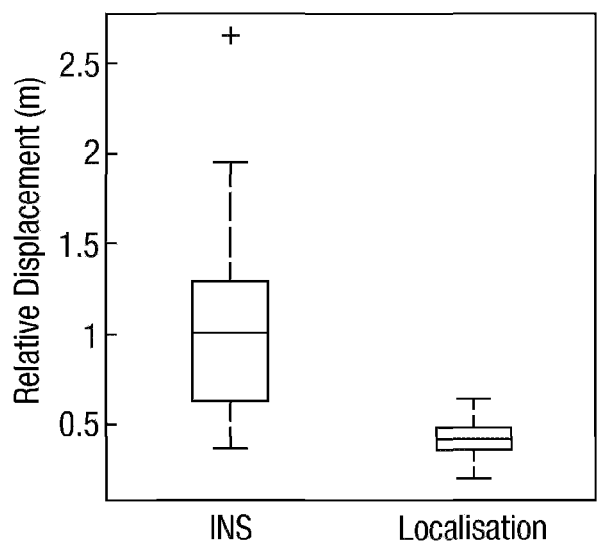
FIG. 11 is a plot showing a comparison of mean displacements based on test data.

However, the displacement of the localization procedure is relatively constant over the site. To validate the technique, the performance of the algorithm was tested over 26 kilometres of trajectory data, spanning a period of three months. These datasets were taken at various times of the day, ranging from early morning (9 a.m.) to early evening (7 p.m.). FIG. 11 shows a comparison of the mean displacement per trajectory, collected over this data. The boxplot depicts the median, $25^{th}$ and $75^{th}$ percentiles of the mean displacement per trajectory, for all the trajectories considered. Not only is the median displacement distinctly lower for the present method, but outliers have been eliminated and the variance of the displacement substantially reduced. This is compelling evidence that localization using the present method is far more repeatable over the long term than relying on the estimates from the INS.

Figure 12:
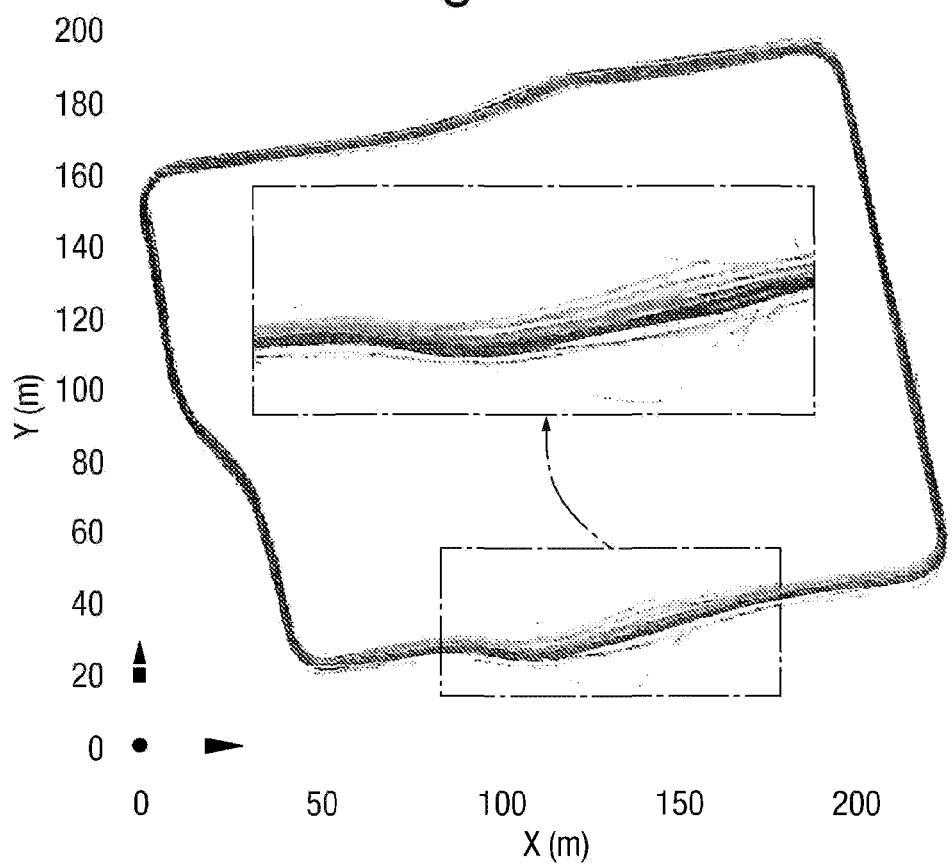
FIG. 12 is a graph comparing trajectories based on test data.

FIG. 12 contrasts the trajectories from the INS system (shown in grey, dotted) and the trajectories obtained from the localization procedure (solid line). Examining the INS trajectories, it can be seen that a distinct wander over time. As expected, the localized trajectories are more consistent of all the datasets, and do not exhibit the gross errors that are clearly visible in the trajectories from the INS.

Figure 13:
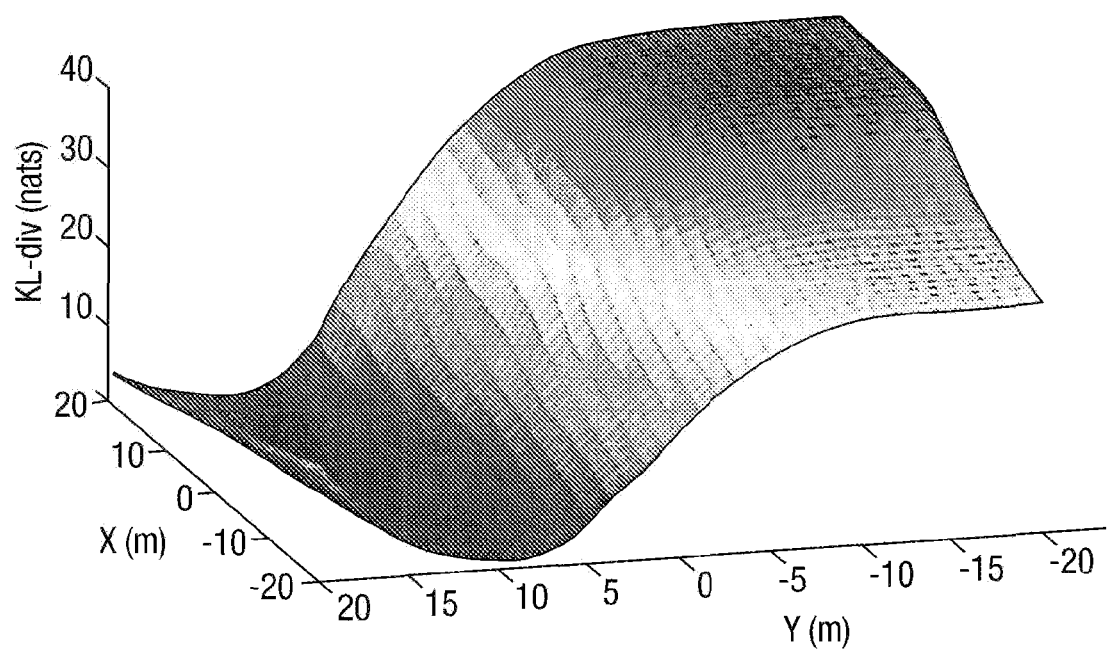
FIG. 13 is a graph showing an exemplar cost surface.

The KL-divergence typically produces a cost-function with a smooth gradient, as can be seen, for example, in FIG. 13. However, it also shows the effect of aliasing—the "corridor" problem, in which the valley in the Figure lies along the forward trajectory of the vehicle (upper-left to lower-centre in the Figure).

The embodiments described herein present a push-broom laser localization system which leverages a prior 3D survey for use on road vehicles.

The invention claimed is:
1. A method of localising a transportable apparatus within an environment, the method comprising:
receiving data obtained from a ranging sensor device of the transportable apparatus configured to collect information relating to at least a surface over which the transportable apparatus is moving in an environment, the ranging sensor device including a clock configured to provide timing information relating to the information relating to at least the surface;
reconstructing motion of the transportable apparatus over a period when the ranging sensor device data was created to generate a new 3D point cloud of the environment, wherein reconstructing motion uses information regarding linear and rotational velocities of the transportable apparatus provided during the period,
obtaining information regarding rotational velocity from a rotational velocity measuring device, the rotational velocity measuring device including a clock to provide timing information relating to the rotational velocity information;
obtaining information regarding linear velocity from a linear velocity measuring device configured to provide information relating to linear velocity of the transportable apparatus, the linear velocity measuring device including a clock to provide timing information relating to the linear velocity information;
calibrating the clock of the ranging sensor device, the clock of the linear velocity measuring device and the clock of the rotational velocity measuring device in order to coordinate information provided by those devices in terms of timing;
adjusting the velocity information provided by the linear velocity measuring device in view of a bias factor, wherein computing the bias factor includes:
scaling observed velocity information over a test section of the environment;
generating a scaled 3D point cloud for the test section;
attempting to align the scaled 3D point cloud with a part of the existing 3D point cloud corresponding to the test section; and using information relating to the attempted alignment to compute the bias factor;

obtaining data representing an existing 3D point cloud of at least part of the environment; and matching the new 3D point cloud with, or within, the existing 3D point cloud in order to localise the transportable apparatus with respect to the existing point cloud.

2. A method, of localizing a transportable apparatus within an environment, the method comprising:

receiving data obtained from a ranging sensor device of the transportable apparatus configured to collect information relating to at least a surface over which the transportable apparatus is moving in an environment, the ranging sensor device including a clock configured to provide timing information relating to the information relating to at least the surface;

reconstructing motion of the transportable apparatus over a period when the ranging sensor device data was created to generate a new 3D point cloud of the environment, wherein reconstructing motion uses information regarding linear and rotational velocities of the transportable apparatus provided during the period, obtaining information regarding rotational velocity from a rotational velocity measuring device, the rotational velocity measuring device including a clock to provide timing information relating to the rotational velocity information;

obtaining information regarding linear velocity from a linear velocity measuring device configured to provide information relating to linear velocity of the transportable apparatus, the linear velocity measuring device including a clock to provide timing information relating to the linear velocity information;

calibrating the clock of the ranging sensor device, the clock of the linear velocity measuring device and the clock of the rotational velocity measuring device in order to coordinate information provided by those devices in terms of timing;

adjusting the velocity information provided by the linear velocity measuring device in view of a bias factor, wherein computing of the bias factor includes:
  analysing the ranging sensor data to identify a first set of repeated features in the environment;
  analysing the existing 3D point cloud data to identify a second set of repeated features;
  computing a warping function to align the first set of repeated features and the second set of repeated features; and
  using the warping function to determine the bias factor;

obtaining data representing an existing 3D point cloud of at least part of the environment; and matching the new 3D point cloud with, or within, the existing 3D point cloud in order to localise the transportable apparatus with respect to the existing point cloud.

3. The method according to claim 2, wherein the repeated features comprise road markings.

4. A non-transitory, tangible computer readable storage medium computer code that when executed by one or more processors causes a process for localizing a vehicle along a route to be carried out, the process comprising:

receiving data obtained from a ranging sensor device of the transportable apparatus configured to collect information relating to at least a surface over which the transportable apparatus is moving in an environment;

using the ranging sensor device data to generate a new 3D point cloud of the environment by:
  reconstructing motion of the transportable apparatus over a period when the ranging sensor device data was created to generate the new 3D point cloud;
  using information regarding linear and rotational velocities of the transportable apparatus provided during the period to generate the new 3D point cloud;
  wherein the ranging sensor device includes a clock configured to provide timing information relating to the information relating to at least the surface;
  wherein the information regarding rotational velocity is obtained from a rotational velocity measuring device, the rotational velocity measuring device including a clock to provide timing information relating to the rotational velocity information;
  wherein the information regarding linear velocity is obtained from a linear velocity measuring device configured to provide information relating to linear velocity of the transportable apparatus, the linear velocity measuring device including a clock to provide timing information relating to the linear velocity information;

calibrating the clock of the ranging sensor device, the clock of the linear velocity measuring device and the clock of the rotational velocity measuring device in order to coordinate information provided by those devices in terms of timing, wherein the calibrating involves computing probabilistic mappings between the clocks; and adjusting the velocity information provided by the linear velocity measuring device in view of a bias factor, wherein the bias factor is computed by:
  scaling observed velocity information over a test section of the environment;
  generating a scaled 3D point cloud for the test section;
  attempting to align the scaled 3D point cloud with a part of the existing 3D point cloud corresponding to the test section; and
  using information relating to the attempted alignment to compute the bias factor obtaining data representing an existing 3D point cloud of at least part of the environment; and seeking to match the new 3D point cloud with, or within, the existing 3D point cloud in order to localise the transportable apparatus with respect to the existing point cloud.

5. A non-transitory, tangible computer readable storage medium comprising computer code that when executed by one or more processors causes a process for localizing a vehicle along a route to be carried out, the process comprising:

receiving data obtained from a ranging sensor device of the transportable apparatus configured to collect information relating to at least a surface over which the transportable apparatus is moving in an environment;

using the ranging sensor device data to generate a new 3D point cloud of the environment by:
  reconstructing motion of the transportable apparatus over a period when the ranging sensor device data was created to generate the new 3D point cloud;
  using information regarding linear and rotational velocities of the transportable apparatus provided during the period to generate the new 3D point cloud;
  wherein the ranging sensor device includes a clock configured to provide timing information relating to the information relating to at least the surface;

wherein the information regarding rotational velocity is obtained from a rotational velocity measuring device, the rotational velocity measuring device including a clock to provide timing information relating to the rotational velocity information;

wherein the information regarding linear velocity is obtained from a linear velocity measuring device configured to provide information relating to linear velocity of the transportable apparatus, the linear velocity measuring device including a clock to provide timing information relating to the linear velocity information;

calibrating the clock of the ranging sensor device, the clock of the linear velocity measuring device and the clock of the rotational velocity measuring device in order to coordinate information provided by those devices in terms of timing, wherein the calibrating involves computing probabilistic mappings between the clocks; and adjusting the velocity information provided by the linear velocity measuring device in view of a bias factor, wherein the bias factor is computed by:
  analysing the ranging sensor data to identify a first set of repeated features in the environment;
  analysing the existing 3D point cloud data to identify a second set of repeated features;
  computing a warping function to align the first set of repeated features and the second set of repeated features; and
  using the warping function to determine the bias factor;
  wherein the repeated features comprise road markings obtaining data representing an existing 3D point cloud of at least part of the environment; and seeking to match the new 3D point cloud with, or within, the existing 3D point cloud in order to localise the transportable apparatus with respect to the existing point cloud.

6. The method according to claim 1, wherein the ranging sensor device comprises a LIDAR device.

7. The method according to claim 6, where, in use, a beam of the LIDAR device is aimed to continually strike the surface whilst the transportable apparatus is moving in use.

8. The method according to claim 6, wherein the LIDAR device is declined at an angle in a range of around 10° to 90° with respect to a main horizontal axis of the transportable apparatus.

9. The method according to claim 2, wherein the ranging sensor device comprises a LIDAR device.

10. The method according to claim 9, where, in use, a beam of the LIDAR device is aimed to continually strike the surface whilst the transportable apparatus is moving in use.

11. The method according to claim 9, wherein the LIDAR device is declined at an angle in a range of around 10° to 90° with respect to a main horizontal axis of the transportable apparatus.

* * * * *